Figure 1:
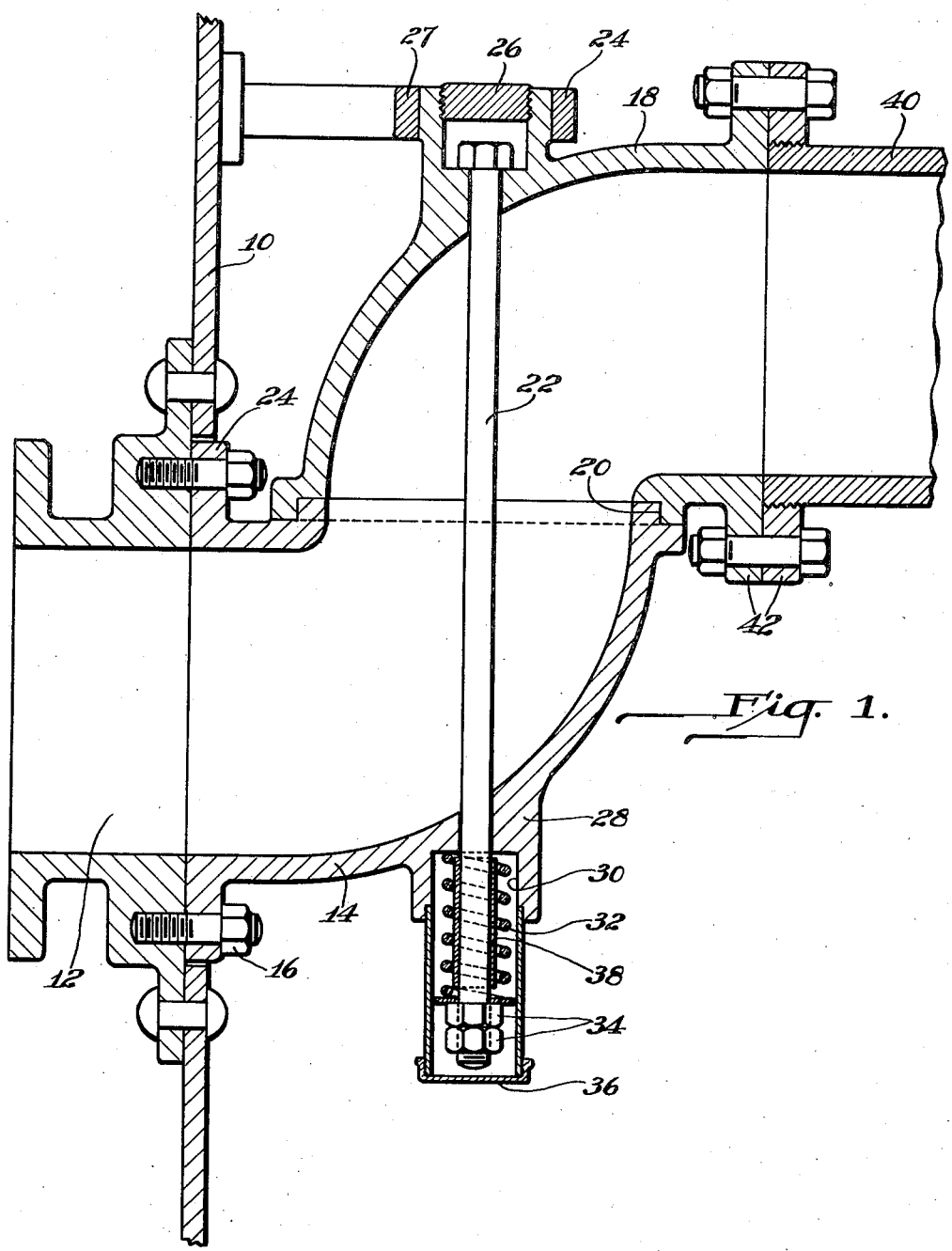

March 14, 1939.  F. V. LONG  2,150,583
SWING JOINT
Filed Aug. 28, 1937  2 Sheets-Sheet 1

WITNESSES
O. B. Wallace.
A. A. Oldham

INVENTOR.
Frank V. Long
BY Brown Critchlow + Flick
his ATTORNEYS.

March 14, 1939.　　　　F. V. LONG　　　　2,150,583
SWING JOINT
Filed Aug. 28, 1937　　　2 Sheets-Sheet 2

WITNESSES
AB Wallace.
A.W. Oldham

INVENTOR.
Frank V. Long
BY Brown, Critchlow & Flick
his ATTORNEYS.

Patented Mar. 14, 1939

2,150,583

UNITED STATES PATENT OFFICE 2,150,583

SWING JOINT

Frank V. Long, Los Angeles, Calif.

Application August 28, 1937, Serial No. 161,382

2 Claims. (Cl. 285—9)

This invention relates to swing joints, and more particularly to joints of this type which are employed in conjunction with swing pipes for use in tanks containing liquid.

In large tanks for storing oil, chemicals or other liquid materials, it has been standard practice for some years to introduce the liquid into the tank or withdraw it from the tank by a swing pipe which comprises a conduit of a length sufficient to reach to the top of the tank and connected at its lower end to a swing joint in turn supported in the tank wall near the bottom thereof. The pipe is ordinarily supported for swinging movement in a vertical plane in the tank as by the provision of gears or cables. In the use of the tank the swing joint and swing pipe are often submerged in the liquid in the tank for long periods and it is highly inconvenient and undesirable to have any breakdown of the swing joint during the years of its service, not only because the tanks must be drained to repair the joints but also because the tanks often contain inflammable or other materials which are or may be dangerous to the workman repairing the joints.

It is desirable to have the swing joints leak-proof and in order to accomplish this they often include resilient means, such as springs, for holding the relative rotary parts of the joint in sealing relation with each other. Such springs are, however, subject to corrosion and breakage which permits the parts of the swing joint to move apart so that they are not maintained in sealing relation with each other and often the movement is of such extent that the function of the joint is entirely lost.

It is the general object of my invention to provide an improved type of swing joint which is relatively inexpensive to manufacture and install and which is capable of operating over many years of service without inspection or repair and in which the rotary parts of the joint are maintained in sealing relation or substantially so by resilient means having associated therewith other means for preventing failure of the joint upon the breakage of the resilient means or the failure of such means to function.

Another and more specific object of my invention is to provide a swing joint having relatively rotary members held together with a bolt and a compression spring, and means for holding the members together in association with the bolt even though the spring becomes broken or loses its function.

Another object of my invention is the provision of an improved swing joint having relatively movable members secured together by positive means including substantially frictionless bearings.

The foregoing and other objects of my invention are achieved by the provision of a swing joint having a pair of tubular members constructed and arranged to have relative rotary motion with each other. Means are provided for holding the members together for such rotary movement and in the preferred embodiment of my invention resilient means are incorporated with the holding means for maintaining the members against each other with a desired force. Completing the combination are means associated with the holding means and the resilient means for supporting the members against movement apart upon failure of the resilient means to perform its function. When resilient means are not employed I use frictionless bearings on the positive means for holding the members together.

Figure 2:
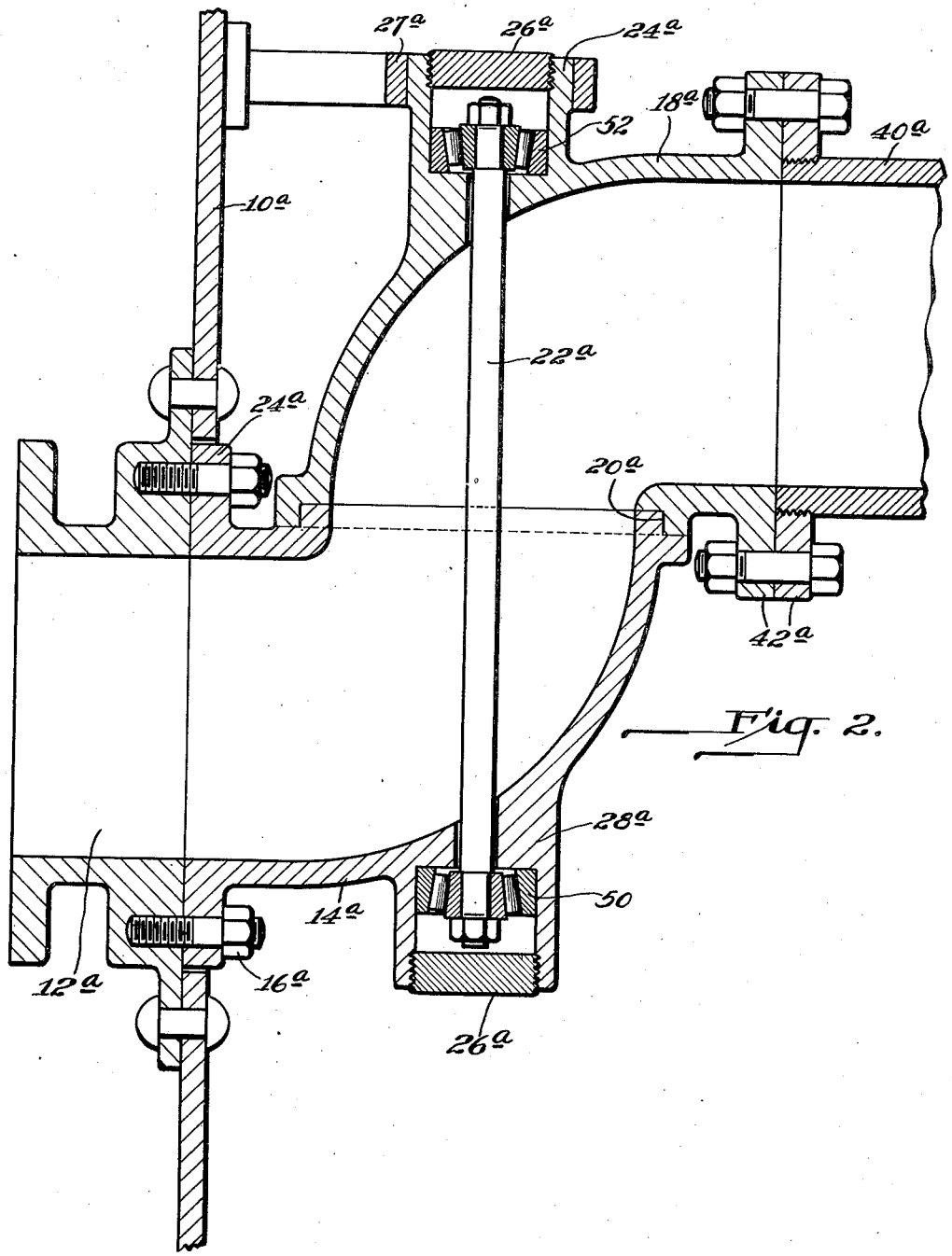

For a better understanding of my invention reference should be had to the accompanying drawings wherein Fig. 1 is a horizontal cross-sectional view through a swing joint incorporating the principles of my invention; and Fig. 2 is a view similar to Fig. 1 but of another embodiment of my invention.

While the improved joint structure herein specifically disclosed and illustrated is capable of use in many relations, it is particularly advantageous in conjunction with swing pipes in liquid receiving tanks and hence has been so illustrated and will be so described, although it should be understood that my invention is not limited to the specific embodiment thereof disclosed.

Referring to the drawings, the numeral 10 indicates the wall of a tank having a port 12 therethrough to which one member 14 of a swing joint is secured as by bolts 16. Complemental to the member 14 is the other member 18 of the swing joint which is adapted to have relative rotary movement therewith. In the form of my invention illustrated, this is accomplished by forming a complementary tongue and groove joint, indicated as a whole by the numeral 20, on the engaging portions of the members and connecting the members together, as for example, by a bolt 22 extending through the axis of the tongue and groove joint 20. The head of the bolt 22 is received in a boss 24 formed on the member 18 and the boss is threaded to receive a plug 26 which seals the end of the bolt in the member 18. The boss 24 may be rotatably supported in a bracket 27 secured to the tank wall 10 and/or to the floor if desired on the larger sizes of joint.

The other end of the bolt 22 extends into a boss 28 formed in the member 14 and provided with a recess 30 of sufficient diameter to receive a helical spring 32. The threaded end of the bolt 22 carries a washer and adjustable lock nuts 34 whereby the tension on the spring 32 can be adjusted to hold the joint 20 of the members 14 and 18 together in sealing relation with a desired force. The outer end of the recess 30 in the boss 28 is threaded internally and receives a threaded end of a cap 36 which seals the end of the bolt 22 with respect to the member 14.

An important part of my inventive concept is to provide means for preventing movement of the members 14 and 18 apart in case the spring 32 breaks or loses its function for any reason. Such means comprise, in the embodiment of my invention illustrated, a sleeve 38 slidably carried by the bolt 22 and positioned within the spring 32. The sleeve 38 is of a length slightly less than the working length of the spring 32, as illustrated, so that the normal function of the spring 32 is retained. However, in case the spring 32 breaks or loses its function, the members 14 and 18 can move but slightly apart inasmuch as the washer and lock nuts 34 engage with one end of the sleeve 38 and the other end of the sleeve 38 engages with the bottom of the recess 30 formed in the boss 28. This slight movement apart of the members which occurs if the spring 32 breaks is not sufficient to interfere with the substantially normal operation of the joint 20 as will be understood.

The member 18 is adapted to be secured to a swing pipe 40, as for example by the provision of flanges 42 and bolts 44, so that the pipe 40 can be moved in a vertical plane in the tank by relative rotary movement of the members 14 and 18. The position of the pipe 40 is controlled by suitable means, such as gears or cables, not shown.

The embodiment of my invention shown in Fig. 2 is similar in most respects to that illustrated in Fig. 1 and hence like parts have been indicated by the same numerals except that the suffix "a" has been added to the numerals of Fig. 2. The form of my invention in Fig. 2 differs from that of Fig. 1 in that the spring 32 and sleeve 38 of Fig. 1 are eliminated and instead the bolt 22a of Fig. 2 is provided with substantially frictionless bearings 50 and 52 which are received by the members 14a and 18a, respectively, and which engage with the bolts 22a.

In this embodiment of my invention the members 14a and 18a are held together in sealing relation at all times and the use of a double set of bearings 50 and 52 permits free rotation of the parts over long periods of use. Moreover, even though one of the bearings fails to function in use the free operation of the joint is not impaired. Thus there is no danger of the members 14a and 18a working apart in the continued use of the joint such as has occurred with the old type of swing joint including a spring which may break. While it is not preferred, I may dispense with the use of the substantially frictionless bearings 50 and 52 in certain installations of the form of my invention shown in Fig. 2.

From the foregoing it will be recognized that the objects of my invention have been achieved by the provision of an improved swing joint which is relatively simple and inexpensive to manufacture and install and yet which is capable of operating over long periods without inspection or repair. My improved joint is adapted to maintain a seal or a substantial seal between the rotary members by holding such members together with a desired resilient force and even though the resilient means for providing this force becomes broken or loses its function or is not employed, my joint still operates satisfactorily.

In accordance with the patent statutes I have particularly illustrated and described one embodiment of my invention. It should be understood, however, that my invention is not limited thereto or thereby but is defined in the appended claims.

I claim:

1. In combination in a swing joint, a pair of tubular members constructed and arranged to have relative rotary motion with each other and including male and female sealing portions, means holding the members together for such rotary movement, resilient means incorporated in the holding means for maintaining the members against each other with a desired force, and means associated with the holding means and other than the resilient means for preventing movement of the male and female sealing portions of the members completely apart upon failure of the resilient means to perform its function.

2. A swing joint comprising a pair of complemental tubular members adapted to have relative rotary movement with each other, bolt means securing the members together and supporting them for such rotary movement, spring means on the bolt means positioned to hold the members together with a desired force, and means just shorter than the working length of the spring means and functioning together with the bolt means to hold the members against movement apart in case the spring means breaks or fails to function.

FRANK V. LONG.